US012656369B2

(12) United States Patent
Altman

(10) Patent No.: US 12,656,369 B2
(45) Date of Patent: Jun. 16, 2026

(54) SYSTEMS, METHODS, AND DEVICES FOR DETERMINING A STATUS OF A CONTAINER

(71) Applicant: Wedgworth's, Inc, Belle Glade, FL (US)

(72) Inventor: Patrick Thomas Altman, Hermitage, TN (US)

(73) Assignee: Wedgworth's, Inc, Belle Glade, FL (US)

( * ) Notice: Subject to any disclaimer, the term of this patent is extended or adjusted under 35 U.S.C. 154(b) by 400 days.

(21) Appl. No.: 18/447,454

(22) Filed: Aug. 10, 2023

(65) Prior Publication Data

US 2025/0052780 A1 Feb. 13, 2025

(51) Int. Cl.
*G01P 15/18* (2013.01)
*B60P 3/22* (2006.01)

(52) U.S. Cl.
CPC .............. *G01P 15/18* (2013.01); *B60P 3/228* (2013.01)

(58) Field of Classification Search
CPC ................................. G01P 15/18; B60P 3/228
See application file for complete search history.

(56) References Cited

U.S. PATENT DOCUMENTS

| | | | | | |
|---|---|---|---|---|---|
| 1,013,789 | A | * | 1/1912 | Longest | B60P 1/165 |
| | | | | | 298/18 |
| 4,722,655 | A | * | 2/1988 | Bonerb | B65D 88/62 |
| | | | | | 414/469 |
| 5,460,473 | A | * | 10/1995 | LaMora | B60P 1/6454 |
| | | | | | 414/500 |
| 9,919,606 | B2 | * | 3/2018 | Barrass | B66F 17/003 |
| 10,624,269 | B1 | * | 4/2020 | Linde | A01D 90/10 |
| 11,543,281 | B1 | * | 1/2023 | Lipscomb | G01P 15/18 |
| 11,981,241 | B2 | * | 5/2024 | Orvegren | G01M 13/02 |
| 12,227,118 | B2 | * | 2/2025 | Godwin, Jr. | B60R 25/01 |

(Continued)

FOREIGN PATENT DOCUMENTS

| | | |
|---|---|---|
| DE | 19800185 B4 | 2/2007 |
| EP | 1119514 A1 | 8/1999 |

(Continued)

*Primary Examiner* — David J Bolduc
(74) *Attorney, Agent, or Firm* — Nelson Mullins Riley & Scarborough LLP

(57) ABSTRACT

Systems, methods, and devices are provided for determining a status of a container. Some example systems include a container configured to rotate such that material(s) that may be disposed within the container are able to exit the container due to gravitational force. The systems also include a device connected to the container, which includes an accelerometer configured to sense movement corresponding to the container discharging the material(s). Such systems may also include a processor and a memory, and the processor may be configured to receive accelerometer data from the accelerometer, determine a tilt angle of the container based on the accelerometer data, determine whether the tilt angle satisfies a predetermined threshold, and cause a user to be notified when the tilt angle satisfies the predetermined threshold. The predetermined threshold may be a value representative of an assumption that a certain amount of the material(s) has been removed from the container.

22 Claims, 9 Drawing Sheets

(56)  References Cited

U.S. PATENT DOCUMENTS

| | | | | |
|---|---|---|---|---|
| 2004/0026959 A1* | 2/2004 | Kostecki | B60P 1/286 | |
| | | | 296/183.2 | |
| 2005/0167164 A1* | 8/2005 | Takeda | B60G 17/018 | |
| | | | 177/136 | |
| 2012/0109542 A1* | 5/2012 | Cebulski | G01F 11/00 | |
| | | | 702/45 | |
| 2013/0041577 A1* | 2/2013 | Puhalla | B60W 40/112 | |
| | | | 701/124 | |
| 2016/0244949 A1* | 8/2016 | Kanemitsu | G01C 9/00 | |
| 2016/0264032 A1* | 9/2016 | Terada | G07C 5/0808 | |
| 2017/0231527 A1* | 8/2017 | Jaeger | A61B 5/11 | |
| | | | 702/141 | |
| 2020/0216240 A1* | 7/2020 | McBride | B65D 55/14 | |
| 2022/0112691 A1* | 4/2022 | Cler | G05D 1/0094 | |
| 2022/0348188 A1* | 11/2022 | Green | G01C 9/00 | |
| 2023/0014528 A1* | 1/2023 | Grohman | G01G 23/01 | |
| 2023/0101013 A1* | 3/2023 | Kim | B65G 1/0492 | |
| | | | 414/277 | |
| 2023/0174366 A1* | 6/2023 | Robinson | B67D 7/3209 | |
| | | | 141/94 | |
| 2024/0140258 A1* | 5/2024 | Peppelaar | B60L 53/68 | |

FOREIGN PATENT DOCUMENTS

| | | | | | |
|---|---|---|---|---|---|
| EP | 942885 A1 | 9/1999 | | | |
| EP | 942885 B1 | 9/2001 | | | |
| EP | 2853641 A1 | 4/2015 | | | |
| EP | 2853641 B1 | 6/2017 | | | |
| JP | H10-195930 A | 7/1998 | | | |
| JP | 2001-507660 A | 6/2001 | | | |
| JP | 2013/028317 A | 2/2013 | | | |
| WO | WO 1998/025842 A1 | 6/1998 | | | |
| WO | WO 1999/057057 A1 | 11/1999 | | | |
| WO | WO 2018/164079 A1 | 9/2018 | | | |
| WO | WO-2022061466 A1 * | 3/2022 | | | G01G 19/083 |

* cited by examiner

SYSTEMS, METHODS, AND DEVICES FOR DETERMINING A STATUS OF A CONTAINER

FIELD OF THE INVENTION

Example embodiments of the present invention generally relate to containers and, more particularly to, systems, methods, and devices for determining a status of a container.

BACKGROUND

Vehicles or trailers with containers are sometimes used for material distribution purposes. For example, a vehicle or trailer may be equipped with one or more containers that are loaded with materials by a first party so that the materials can be distributed by a second party, such as on-demand at a site being operated by the second party. The second party often fails to inform the first party when the one or more containers become empty, however, and thus processes related to distribution may become inefficient, resulting in unnecessary delay in providing the materials. Improvements in the foregoing are desired.

BRIEF SUMMARY

Some example embodiments of the present invention include systems, methods, and devices for determining when a container is empty or has reached a certain status. The container(s) described herein may be connected to a vehicle or trailer. For example, in some embodiments, a vehicle or trailer may comprise four containers, and each may be configured to rotate to dispense material therefrom (such as due to the influence of gravity). In some embodiments, a device comprising an accelerometer, among other components, may be used to calculate a tilt angle of a container, and the tilt angle may be used to determine whether a predetermined amount of material has been emptied out of the container. Further, in some embodiments, the container (or the vehicle or trailer on which the container is disposed) may include a location sensor, and a processor may be configured to utilize location data from the location sensor, such as to disregard data that is within a predetermined area and/or provide a notification to a remote user regarding the location of the container, vehicle, and/or trailer. Utilizing location within the system may be useful to confirm the status of the container, and whether the status makes sense in view of the planned distribution of the material (e.g., did the vehicle move locations, is it returning to the first party, etc.). It may also be useful, for example, in situations when a first party is loading materials into the container within the predetermined area and the first party does not need to know the status of the container until it has left the predetermined area for the materials to be distributed.

In some embodiments, a system may include a container configured to rotate such that at least some of one or more materials that are optionally disposed within the container are able to exit the container due to gravitational forces, and the system may also include a device connected to the container. For example, the device may be located on a side wall of the container, on a bottom wall of the container, on a rotational axis of the container, or anywhere else on the container. The device may include an accelerometer configured to sense movement corresponding to the container discharging the at least some of the one or more materials. A processor may be configured to receive data from the device, determine a tilt angle of the container using the accelerometer data, and then determine whether the tilt angle indicates that a predetermined amount of material has been deposited from the container. For example, the processor may determine whether the tilt angle indicates that the container is empty. The processor may then cause a user to be notified accordingly.

In an example embodiment, a system is provided. The system includes a container configured to rotate such that at least some of one or more materials that are optionally disposed within the container are able to exit the container due to gravitational force and a device attached to the container. The device includes an accelerometer configured to sense movement corresponding to the container discharging the at least some of the one or more materials. The system also includes a processor and a memory including computer executable instructions. The computer executable instructions are configured to, when executed by the processor, cause the processor to receive accelerometer data from the accelerometer, determine a tilt angle of the container based on the accelerometer data, and determine whether the tilt angle satisfies a predetermined threshold. The predetermined threshold is a value representative of an assumption that a certain amount of the one or more materials has been removed from the container. The computer executable instructions are also configured to, when executed by the processor, cause the processor to cause a user to be notified when the tilt angle satisfies the predetermined threshold.

In some embodiments, the system may further include at least one of a vehicle or a trailer that includes the container.

In some embodiments, the value may be representative of an assumption that the container is empty.

In some embodiments, the device may further include a location sensor configured to determine location data corresponding to a current location. The processor may be further configured to receive the location data, determine whether the location data is outside of a predetermined geographical area, and in response to the determination that the location data is outside of the predetermined geographical area, perform at least one of the following cause an indication to be provided or disregard the data. The indication may be associated with the current location.

In some embodiments, the processor and the memory may be located at a remote location.

In some embodiments, the processor and the memory may be located within the device.

In some embodiments, the device may be positioned on a rotational axis of the container.

In some embodiments, the device may be positioned on a side wall of the container.

In some embodiments, the device may be positioned on a bottom wall of the container.

In some embodiments, causing the user to be notified when the tilt angle satisfies the predetermined threshold may include at least one of sending a signal to a remote location or presenting a notification on a display.

In some embodiments, the tilt angle may be determined by comparing the accelerometer data with at least one of past accelerometer data or predetermined data.

In another example embodiment, a system is provided. The system includes a plurality of containers, and each container of the plurality of containers is configured to rotate such that at least some of one or more materials that are optionally disposed therein is able to exit therefrom due to gravitational force. The system also includes a plurality of devices, and each device of the plurality of devices is attached to one of the plurality of containers and comprises an accelerometer configured to sense movement corresponding to a corresponding container discharging the at least some of the one or more materials. The system also includes a processor and a memory including computer executable instructions. The computer executable instructions are configured to, when executed by the processor, cause the processor to receive accelerometer data from an accelerometer of one of the plurality of devices, determine, based on the received accelerometer data, a tilt angle of the container corresponding to the one of the plurality of devices, and determine whether the determined tilt angle satisfies a predetermined threshold. The predetermined threshold is a value representative of an assumption that a certain amount of the one or more materials has been removed from the container. The computer executable instructions are also configured to, when executed by the processor, cause the processor to cause a user to be notified when the tilt angles satisfies the predetermined threshold.

In some embodiments, the system may further include at least one of a vehicle or a trailer comprising the plurality of containers.

In some embodiments, the value may be representative of an assumption that the container being evaluated is empty.

In some embodiments, the each device may further include a location sensor configured to determine location data corresponding to a current location, and the processor may be further configured to receive the location data, determine whether the location data is outside of a predetermined geographical area, and in response to the determination that the location data is outside of the predetermined geographical area, perform at least one of the following cause an indication to be provided or disregard the data. The indication may be associated with the current location.

In some embodiments, the processor and the memory may be located at a remote location.

In some embodiments, the processor and the memory may be located within the each device.

In some embodiments, causing the user to be notified when at least one of the tilt angles satisfies the predetermined threshold may include at least one of sending a signal to a remote location or presenting a notification on a display.

In some embodiments, the processor may be further configured to cause the user to be notified when all of the tilt angles satisfy the predetermined threshold.

In another example embodiment, a method is provided. The method includes receiving accelerometer data from an accelerometer configured to sense movement corresponding to a container discharging at least some of one or more materials, and the container is configured to rotate such that the at least some of the one or more materials are able to exit the container due to gravitational force. The method also includes determining a tilt angle of the container based on the accelerometer data and determining whether the tilt angle satisfies a predetermined threshold. The predetermined threshold is a value representative of an assumption that a certain amount of the one or more materials has been removed from the container. The method also includes causing a user to be notified when the tilt angle satisfies the predetermined threshold.

In another example embodiment, a device for determining a tilt angle of a container configured to discharge at least some of one or more materials by rotating such that the at least some of the one or more materials are able to exit the container due to gravitational force is provided. The device includes an accelerometer configured to sense movement corresponding to the container discharging the at least some of one or more materials, a processor, and a memory including computer executable instructions, the computer executable instructions configured to, when executed by the processor, cause the processor to receive accelerometer data from the accelerometer, determine a tilt angle of the container based on the accelerometer data, and determine whether the tilt angle satisfies a predetermined threshold. The predetermined threshold is a value representative of an assumption that a certain amount of the one or more materials has been removed from the container. The computer executable instructions are also configured to, when executed by the processor, cause the processor to cause a user to be notified when the tilt angle satisfies the predetermined threshold.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
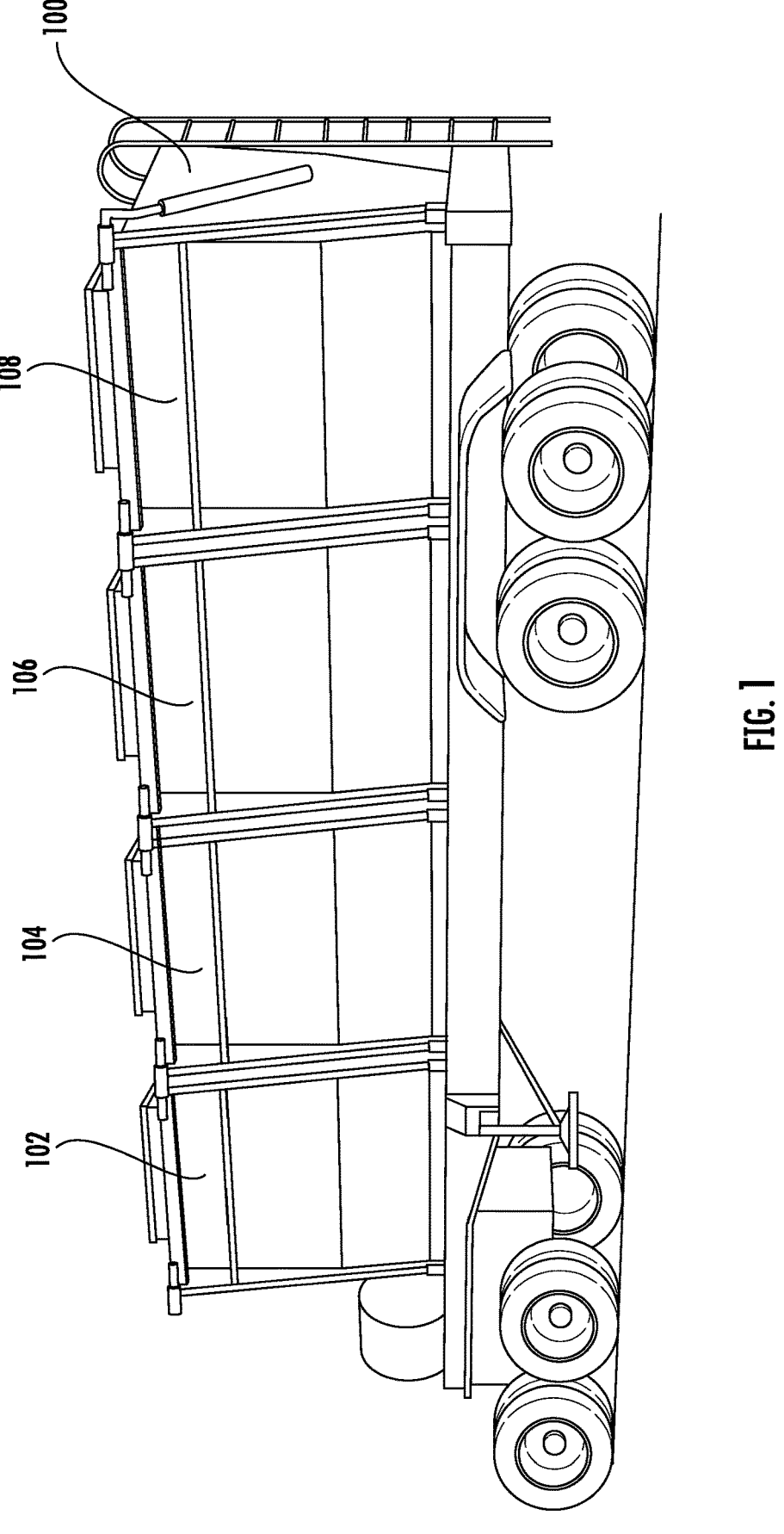
FIG. 1 shows an example trailer with four containers, in accordance with some embodiments discussed herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

FIG. 1 shows a trailer 100 with a first container 102, a second container 104, a third container 106, and a fourth container 108. Although the embodiment shown in FIG. 1 is a trailer 100, in other embodiments, the trailer 100 may be a truck or any other vehicle or a stand or any other structure. Each of the first container 102, the second container 104, the third container 106, and the fourth container 108 may be configured to rotate such that at least some of one or more materials that are optionally disposed within the container are able to exit the container due to gravitational force. The trailer 100 may be configured to be filled either partially or fully with materials such as fertilizer, soil, and/or other material, and then the container may rotate, e.g., outward and/or downward to dispense the one or more materials. In some cases, the trailer 100 may be filled with a certain amount of material at a first location (e.g., by a first party) and then delivered to a second location for the one or materials to be distributed (e.g., under the control of a second party). Further, in some cases, the distribution may be sporadic, gradual, and/or otherwise non-uniform-making determining when the materials are depleted and/or new materials are needed difficult. In this regard, it may be desirable to determine how much of the one or more materials have been distributed or otherwise depleted while the trailer 100 is at the second location without having a user at the second location manually check the status of the first container 102, the second container 104, the third container 106, and the fourth container 108 on the trailer 100. For example, it may be desirable for a user at the first location (or at any other location) to be notified when one or all of the first container 102, the second container 104, the third container 106, and/or the fourth container 108 have reached a certain status (e.g., empty). The systems, methods, and devices disclosed herein include devices that are attachable to such containers and enable a user to be notified when tilt angle(s) of the containers reach a certain value indicating that the containers have been sufficiently depleted.

Figure 2:
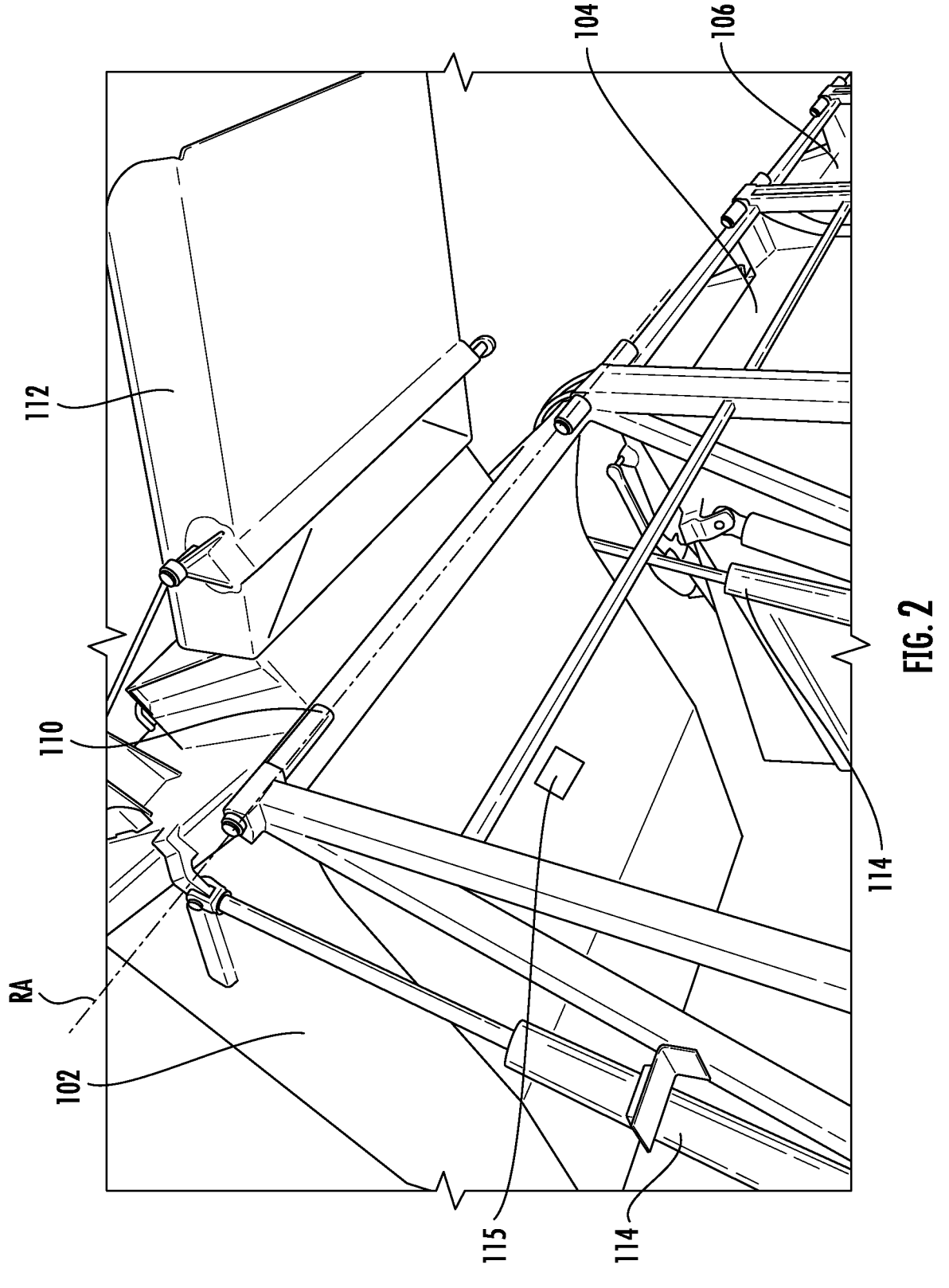
FIG. 2 shows one of the containers of FIG. 1 having been tilted to dispense one or more materials disposed therein, in accordance with some embodiments discussed herein.

FIG. 2 is a zoomed in view of the first container 102 being tilted about a beam 110, the beam 110 defining a rotational axis RA. The first container 102 may be configured to rotate about the rotational axis RA such that at least some of material(s) that are optionally disposed within the first container 102 are able to exit the first container 102 due to gravitational force. The first container 102 includes a ramp 112 configured to guide the one or more materials as they are tilted out of the first container 102. In some embodiments, the first container 102 may be tiltable by hydraulic actuators 114, as shown. Other tilting mechanisms are also contemplated within the scope of this disclosure, however.

The first container 102 may include a first device 115 disposed on a side wall of the first container 102, and the first device 115 may include an accelerometer configured to sense movement corresponding to the first container 102 discharging the at least some of the material(s). The first device 115 may be battery powered in some embodiments, but in other embodiments, the first device 115 may be powered in any other way. Included in either the first device 115 or at a remote location, such as on the trailer 100, on a nearby vehicle, or at a farther remote location, may be a processor. The processor may be configured to receive data from the device 115, such as accelerometer data, among other types of data. The receipt of data may occur at intervals, such as in intervals of 10 minutes when no movement is detected and intervals of 1 second when movement is detected. In some embodiments, the data may be provided in response to sensing occurring at the accelerometer. The processor may use the data to determine a tilt angle of the first container 102. The determined tilt angle may then be used to determine a status of the first container 102. That is, the processor may be configured to determine whether the determined tilt angle satisfies a predetermined threshold, and the predetermined threshold may be a value representative of an assumption that a certain amount of the material(s) have been removed from the first container 102.

For example, when the determined tilt angle reaches a maximum, the processor may determine that the first container 102 is empty.

The processor may be configured to cause a user to be notified when the first container 102 reaches a tilt angle that satisfies the predetermined threshold (or multiple times if multiple predetermined thresholds are utilized). For example, the processor may send a signal to a remote location or may present a notification on a display. Although the processor may be configured to determine when a maximum tilt angle has been reached in some embodiments, in other embodiments, the processor may be configured to determine when a different tilt angle (e.g., 70 percent of the maximum tilt angle of the first container 102) has been reached and cause the notification to the user accordingly.

The first device 115 may include other data as well, such as GPS data. Although optional, in some embodiments, the GPS data may be included such that, when a notification is made to a user indicating the designated tilt angle has been reached, a location is also sent with the notification so that the user can easily locate the first container 102. Other data may be detected and transmitted by the first device 115 as well.

It should be appreciated that, while the first device 115 is positioned on a side wall of the first container 102 in FIG. 2, the first device 115 could be positioned anywhere on the first container 102. For example, the first device 115 could be positioned on a bottom wall of the first container 102 or on the beam 110 defining the rotational axis RA of the first container 102. The first device 115 could also be located on the ramp 112 of the first container 102 or anywhere else on the first container 102.

FIGS. 3A-3E show an example container 118 with a device 120 disposed thereon. It should be appreciated that, although the device 120 is disposed on a middle portion of a side wall of the container 118 in FIGS. 3A-3E, in other embodiments, the device 120 may be disposed anywhere else on the container 118. For example, in some embodiments, the device 120 may be disposed on or near a top edge of the side wall of the container 118 that is opposite the side wall on which the device 120 is disposed in FIGS. 3A-3E. Other configurations are also contemplated within the scope of this disclosure. Also shown are arrows representing an x-axis acceleration vector X, a y-axis acceleration vector Y, and a gravity acceleration vector G. The gravity acceleration vector G is 9.81 meters per second squared, and the x-axis acceleration vector X and the y-axis acceleration vector Y vary as the container 118 is tilted. In the embodiments shown, the container 118 is tilted from being straight up (e.g., not tilted) at FIG. 3A, to being tilted to 90 degrees at FIG. 3B, to being tilted back to 70 degrees at FIG. 3C (20 degrees in the opposite direction), to being tilted back to 90 degrees at FIG. 3D, and then back to being straight up (e.g., not tilted) at FIG. 3E. The device 120 is configured to detect values of the x-axis accelerometer vector X and the y-axis accelerometer vector Y at each position and then transmit the data that it detects to a processor, which may be located within the device or elsewhere.

Figure 3:
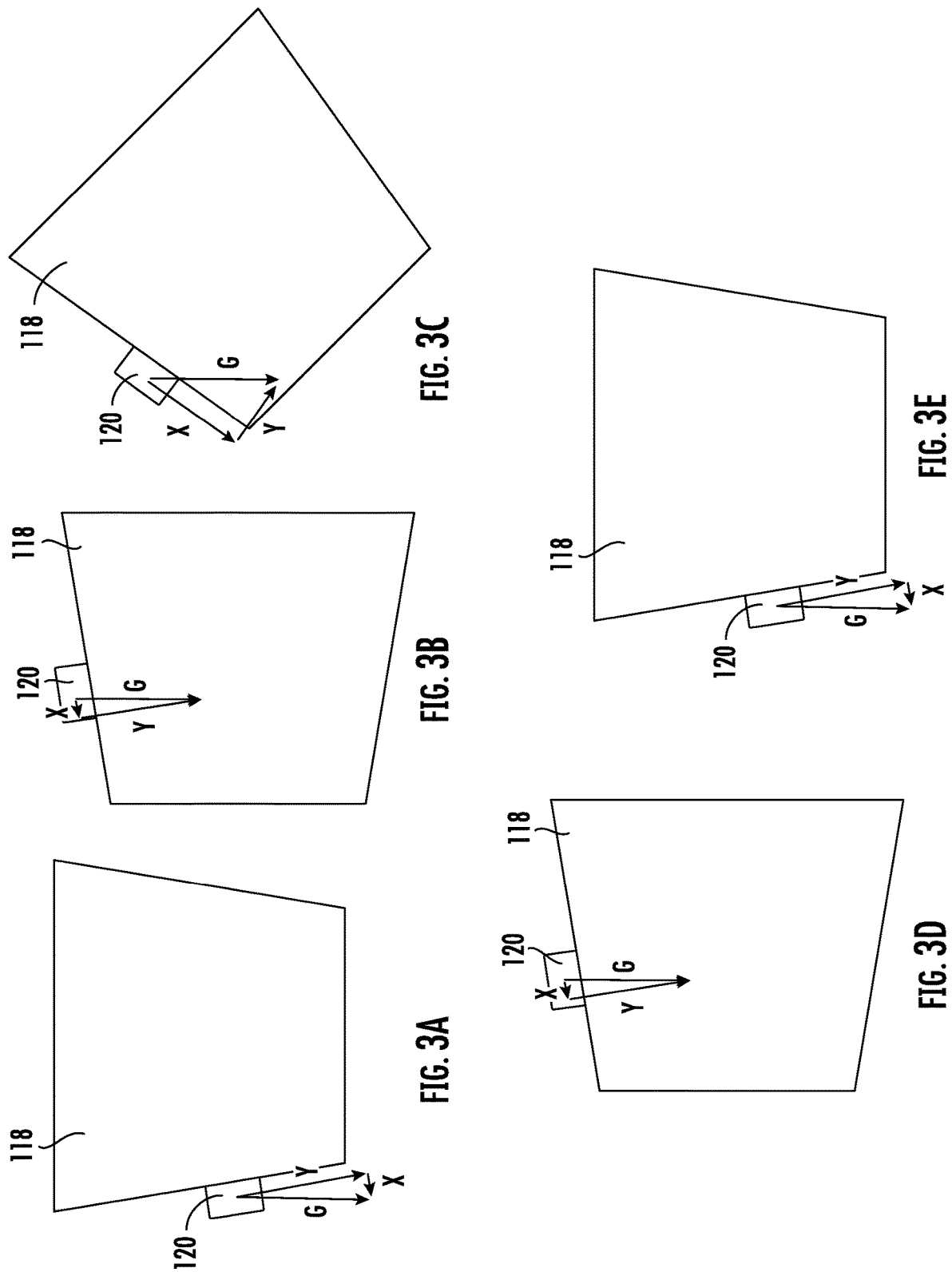
FIGS. 3A-3E show a schematic of another container with a device disposed thereon to detect tilting movements of the container, in accordance with some embodiments discussed herein.
Figure 4:
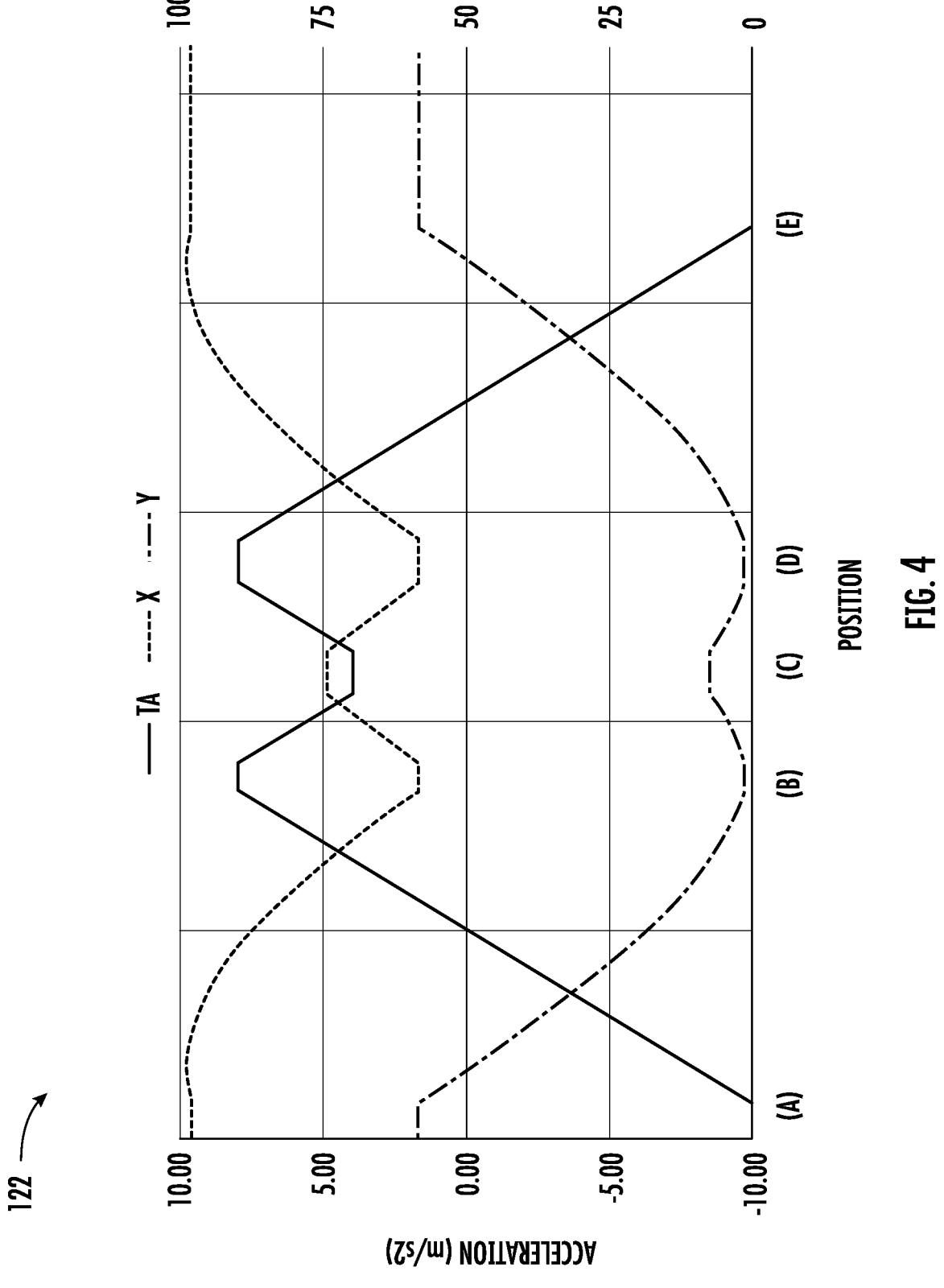
FIG. 4 is a graph showing the acceleration and tilt angle values of the schematics shown in FIGS. 3A-3E, in accordance with some embodiments discussed herein.

For example, FIG. 4 is a graph 122 of values of the x-axis accelerometer vector X and values of the y-axis accelerometer vector Y of the device 120 in FIGS. 3A-3E. The x-axis of the graph 122 represents the positions (a), (b), (c), (d), and (c) corresponding to FIGS. 3A-3E, and the y-axis of the graph 122 represents, for the x-axis acceleration vector X values and the y-axis acceleration vector Y values, acceleration values in units of meters per second squared (shown on the left of the graph 122). The graph 122 also shows bin tilt angle TA values, which are measured in degrees of the container 118 having been tilted clockwise from the upright (or straight up) position, as shown in FIGS. 3A-3E (shown on the right of the graph 122).

As shown in the graph 122, when the container 118 is not tilted (such as in positions (a) and (c), corresponding to FIGS. 3A and 3E), the value of the y-axis acceleration vector Y may have a first value, and when the container 118 is tilted to its maximum tilt position, such as in positions (b) and (d) (corresponding to FIGS. 3B and 3D), the value of the y-axis acceleration vector Y may have a second value. For example, the second value may be close to 9.81 meters per second squared (which is the acceleration of gravity). Similarly, when the container 118 is not tilted (such as in positions (a) and (c), corresponding to FIGS. 3A and 3E), the value of the x-axis acceleration vector X may have a first value that is, e.g., close to 9.81 meters per second squared (which is the acceleration of gravity), and when the container 118 is tilted to its maximum tilt position, such as in positions (b) and (d) (corresponding to FIGS. 3B and 3D), the value of the x-axis acceleration vector X may have a second value. At position (c) (corresponding to FIG. 3C), in which the container 118 is partially tilted, the value of the y-axis acceleration vector Y may have a third value (e.g., approximately 8 meters per second squared), and the value of the x-axis acceleration vector X may have a third value (e.g., approximately 5 meters per second squared).

As also shown in FIG. 4, the x-axis accelerometer vector X values and the y-axis accelerometer vector Y values may be used to calculate bin tilt angle TA values of the container 118 at a given point in time. For example, the bin tilt angle TA values may be calculated using an arc tangent function that uses an adjustment value to account for how the device 120 is mounted with respect to the container 118. In the chart 122 shown in FIG. 4, at position (a) (corresponding to FIG. 3A), the container 118 is not tilted at all, having a tilt angle of 0 degrees. At position (b) (corresponding to FIG. 3B), the container 118 is fully tilted, having a tilt angle of approximately 90 degrees. At position (c) (corresponding to FIG. 3C), the container 118 is partially tilted with a tilt angle of approximately 70 degrees. At position (d) (corresponding to FIG. 3D), the container 118 is fully tilted, having a tilt angle of approximately 90 degrees. Finally, at position (c) (corresponding to FIG. 3E), the container 118 is not tilted at all, having a tilt angle of 0 degrees.

In some embodiments, the determination of the tilt angle may factor in an amount of time that the container is at a certain tilt angle. For example, the tilt angle may more accurately correspond to a resultant amount of material therein if the container maintained the tilt angle for at least a predetermined amount of time (e.g., 10 seconds, 30 seconds, 1 minute, 2 minutes, etc.)—as gravity may then have had enough time to overcome various extraneous forces, such as friction, to dump out the materials and allow the amount of material in the container to reach more of an equilibrium with respect to the tilt angle.

Figure 5:
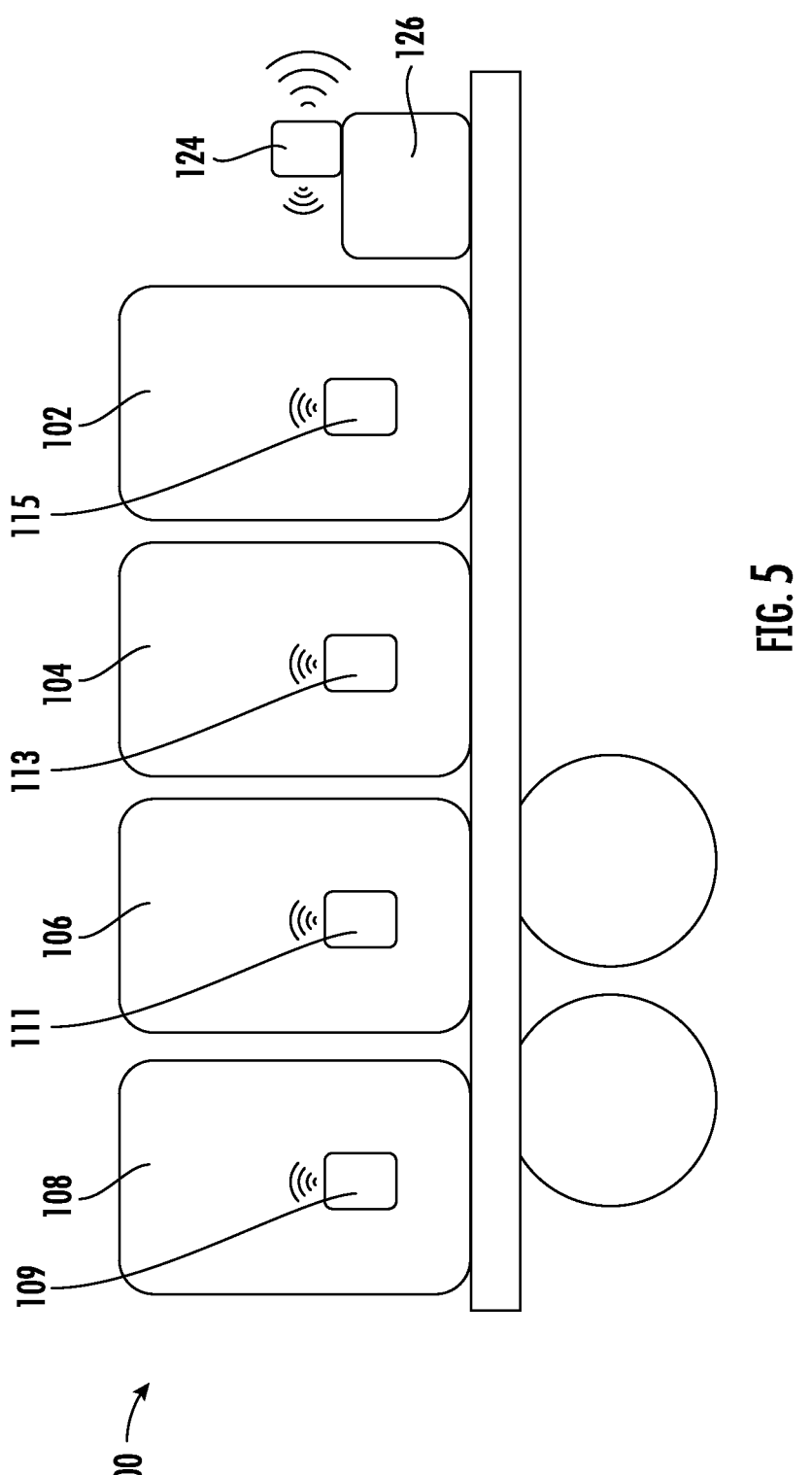
FIG. 5 is a schematic showing the trailer and the four containers, such as shown in FIG. 1, each container having a device attached thereto that is in communication with a gateway, in accordance with some embodiments discussed herein.

FIG. 5 shows the trailer 100 with the first container 102 having the first device 115, the second container 104 having a second device 113, the third container 106 having a third device 111, and the fourth container 108 having a fourth device 109. The trailer 100 also includes a generator 126 and a gateway 124. The gateway 124 may be in communication with each of the first device 115, the second device 113, the third device 111, and the fourth device 109. Further, a processor may be located within the gateway 124, or the processor may be located elsewhere and be in communication with the gateway 124 (and therefore the first device 115, the second device 113, the third device 111, and the fourth device 109). Additionally or alternatively, in some embodiments, each of the first device 115, the second device 113, the third device 111, and the fourth device 109 may have a processor. For example, the trailer 100 may not have the gateway 124 at all, and each of the first device 115, the second device 113, the third device 111, and the fourth device 109 may have a processor (e.g., a microprocessor), a location sensor, an accelerometer, and/or a cellular component for data communication. Further, each device may have a microprocessor that is configured to live stream data to a remote processor that uses the live stream data to make determinations. In this way, the processor(s) may be located anywhere, and each of the first device 115, the second device 113, the third device 111, and the fourth device 109 may include any of a variety of components.

Figure 6:
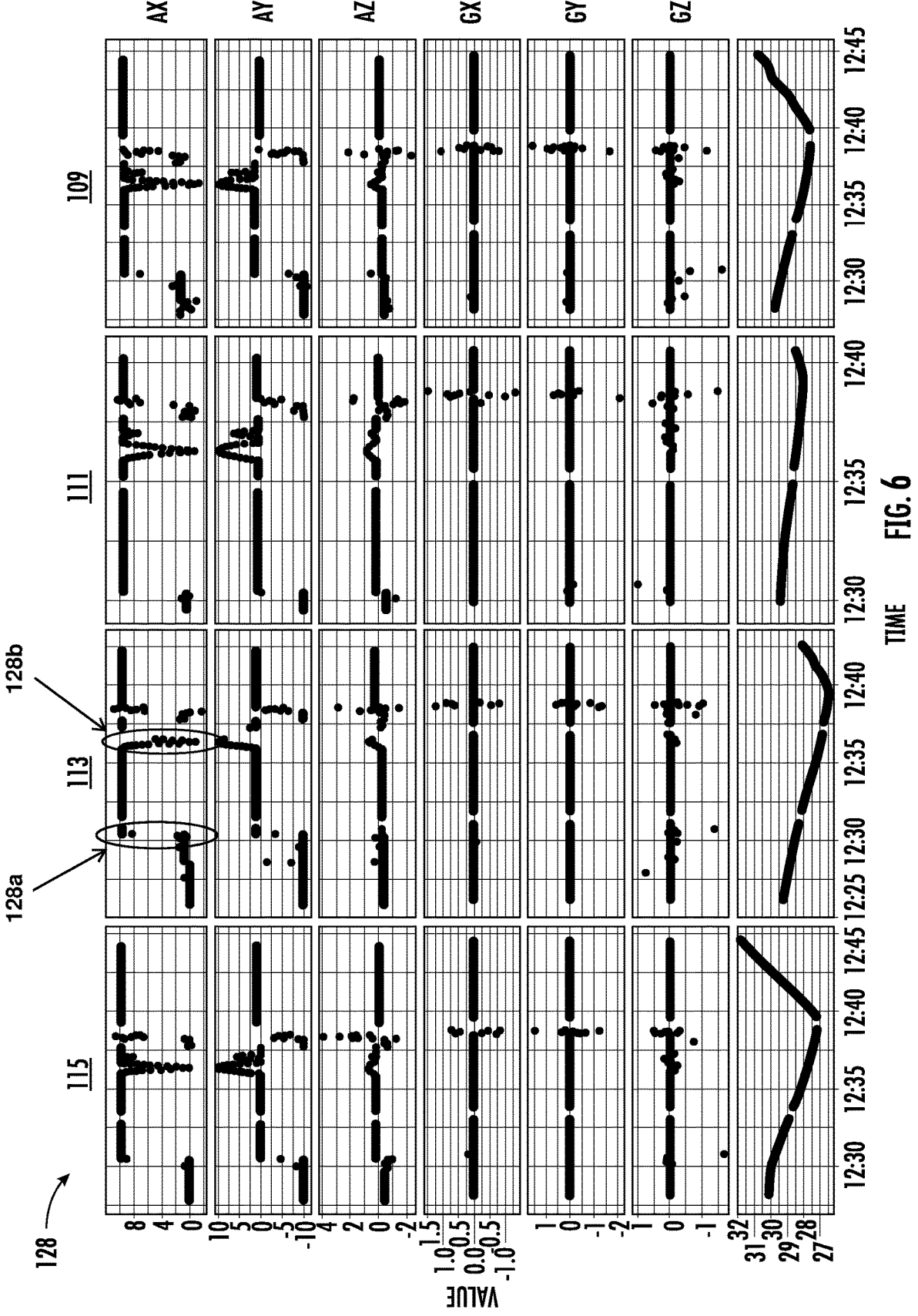
FIG. 6 is a graph showing data of the four devices of FIG. 5, in accordance with some embodiments discussed herein.

FIG. 6 is an example graph 128 showing values for x-axis acceleration vectors AX, y-axis acceleration vectors AY, z-axis acceleration vectors AZ, x-axis gyroscopic vectors GX, y-axis gyroscopic vectors GY, z-axis gyroscopic vectors GZ, and temperature T, each plotted on the y-axis with time as the x-axis. In the graph 128, such values are shown for each of the first device 115, the second device 113, the third device 111, and the fourth device 109. Notably, the graph data illustrate a situation where all four devices were tilted together from a straight up to 90 degrees and then rotated back to straight up (with that first shift occurring at 128a in the graph data). Then, from straight up, the four devices were tilted to about 45 degrees and then shifted back to straight up (with that second shift occurring at 128b). This illustrates various example data shifts that can be used, in some embodiments, to determine a tilt angle of the device (and the attached container).

Although the values for the x-axis gyroscopic vectors GX, y-axis gyroscopic vectors GY, z-axis gyroscopic vectors GZ, and temperature T may be optional, a gyroscope and a thermometer may be included in each of the first device 115, the second device 113, the third device 111, and the fourth device 109 in order to provide more information to the user being notified. For example, the processor may use such values to determine the tilt angles of the first container 102, the second container 104, the third container 106, and the fourth container 108 and/or to verify the accuracy of such tilt angles. Other features may also be incorporated within the device as well, such as to detect other types of data.

Further, the z-axis acceleration vectors AZ may be optional in some embodiments. For example, the device(s) may be placed on the container(s) in such a way so that only the x-axis acceleration vectors AX and the y-axis acceleration vectors AY are relevant to determining the tilt angles values. For example, a device may be mounted onto a beam defining a rotational axis about which the container is configured to rotate (e.g., beam 110 defining rotational axis RA in FIG. 2). This may simplify the calculations and allow for a two-axis accelerometer to be used instead of a three-axis accelerometer.

Figure 7:
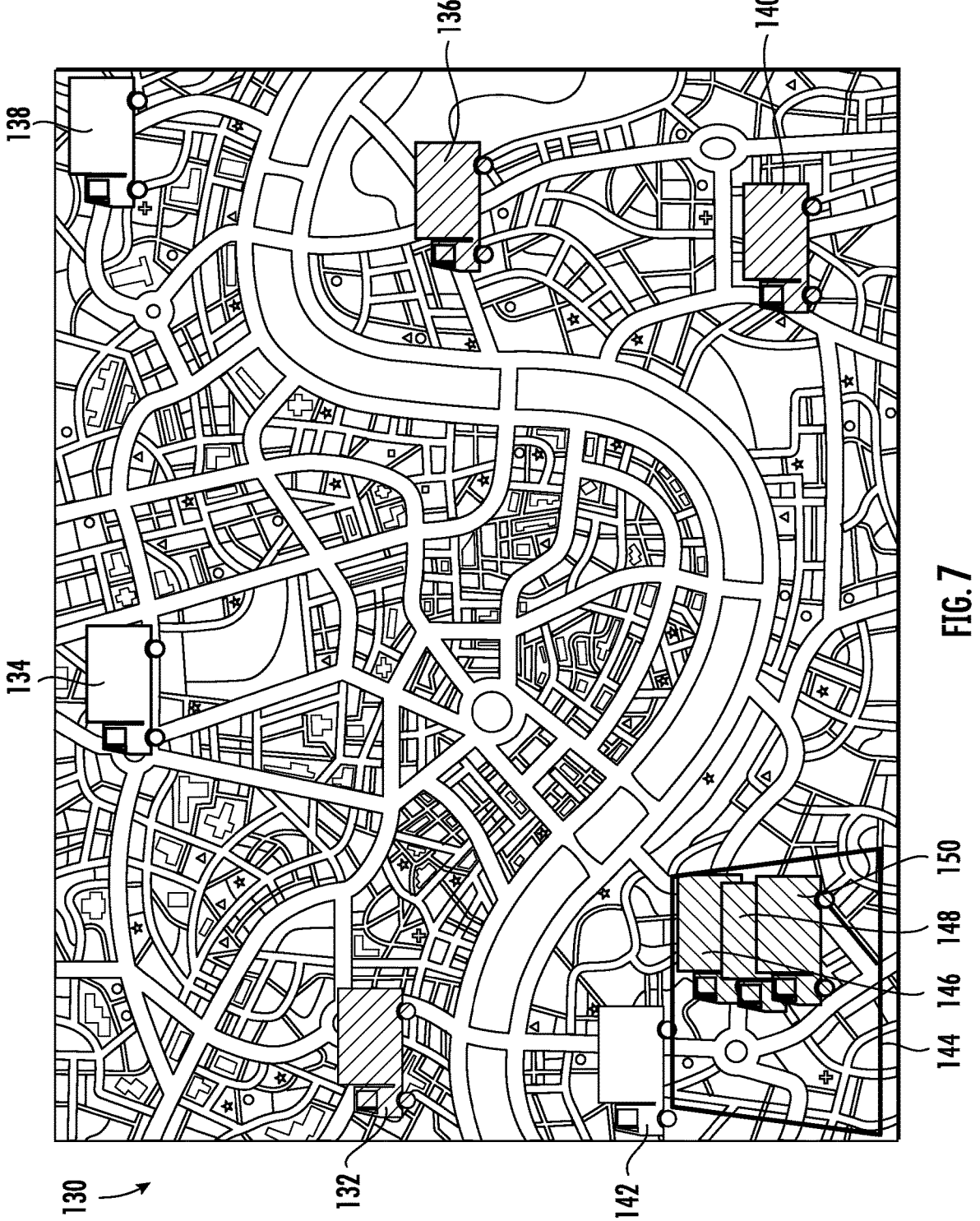
FIG. 7 is a map showing locations of various vehicles with containers, in accordance with some embodiments discussed herein.

FIG. 7 shows a map 130 with an area of interest 144 indicated thereon. In some embodiments, the area of interest 144 may be a geographic region representing a facility such as a distribution center, but in other embodiments, the area of interest 144 may be any other type of area. A first vehicle 146, a second vehicle 148, and a third vehicle 150 are located within the area of interest 144. In some embodiments, the first vehicle 146, the second vehicle 148, and the third vehicle 150 may be being refilled with materials while in the area of interest 144. The map 130 also includes a fourth vehicle 132, a fifth vehicle 136, a sixth vehicle 140, a seventh vehicle 142, an eighth vehicle 134, and a ninth vehicle 138. All of the fourth vehicle 132, the fifth vehicle 136, the sixth vehicle 140, the seventh vehicle 142, the eighth vehicle 134, and the ninth vehicle 138 are positioned outside of the area of interest 144. In some embodiments, each of the vehicles may include at least one device including a location sensor (e.g., in addition to an accelerometer, as described herein). In addition to accelerometer data, as described herein, data obtained using the device may further include location data.

For example, data from devices within the fourth vehicle 132, the fifth vehicle 136, the sixth vehicle 140, the seventh vehicle 142, the eighth vehicle 134, and the ninth vehicle 138 may be working to indicate whether containers thereon are empty (or depleted to a desired amount). The fourth vehicle 132, the fifth vehicle 136, and the sixth vehicle 140 may still have adequate amounts of materials in the containers therein, as determined using accelerometer data as described herein. Further, the seventh vehicle 142, the eighth vehicle 134, and the ninth vehicle 138 may not have adequate amounts of materials in the containers therein, as determined using accelerometer data as described herein. Notifications may have been sent, therefore, to cause a user to be notified that the tilt angles have satisfied the predetermined threshold with respect to the seventh vehicle 142, the eighth vehicle 134, and the ninth vehicle 138. This may indicate to the user that the user should, for example, take actions to return the seventh vehicle 142, the eighth vehicle 134, and the ninth vehicle 138 to the area of interest 144 to be refilled. Once the seventh vehicle 142, the eighth vehicle 134, and the ninth vehicle 138 are refilled (and have exited the area of interest 144), the devices on the seventh vehicle 142, the eighth vehicle 134, and the ninth vehicle 138 may be reset.

In some embodiments, a processor may be configured to determine whether the location data is within a predetermined area (e.g., area of interest 144) and, in response to a determination that the location data is within the predetermined area, disregard the data. Because the first vehicle 146, the second vehicle 148, and the third vehicle 150 are within the area of interest 144, the processor may be configured to disregard the data (e.g., accelerometer data). This may be useful because the user might not need to know the statuses of vehicles and/or containers until after they have left a property that is e.g., owned and/or operated by the user. This may prevent unwanted data from crowding data with respect to the fourth vehicle 132, the fifth vehicle 136, the sixth vehicle 140, the seventh vehicle 142, the eighth vehicle 134, and the ninth vehicle 138, which, in some embodiments, is the data that the user is interested in evaluating.

It should be appreciated that, in other embodiments, systems and devices may operate without any area of interest 144 at all (e.g., the processor may, in some embodiments, not disregard any data). Additionally, in some further embodiments, systems and devices might not have a location sensor or location data at all. For example, acceleration data may be processed by a processor along with vehicle identification numbers, or the acceleration data may be processed by a processor without any other information. Other configurations are also contemplated.

In some embodiments, the location data may be utilized for other features, such as confirming that the container is in the proper location and/or confirming that the container is being returned, among other things. In some embodiments, the location data may be provided to correlate with one or more devices, such as when multiple devices are present on a vehicle (e.g., trailer, truck, etc.). In some such embodiments, containers may be appropriately transferred between locations to provide the materials at each location. In some cases, therefore, knowing the location along with the specific material may be useful in determining what (if any) notification to provide to a user and/or for providing to the user for determination of appropriate action (if any).

Example System Architecture(s)

Figure 8:
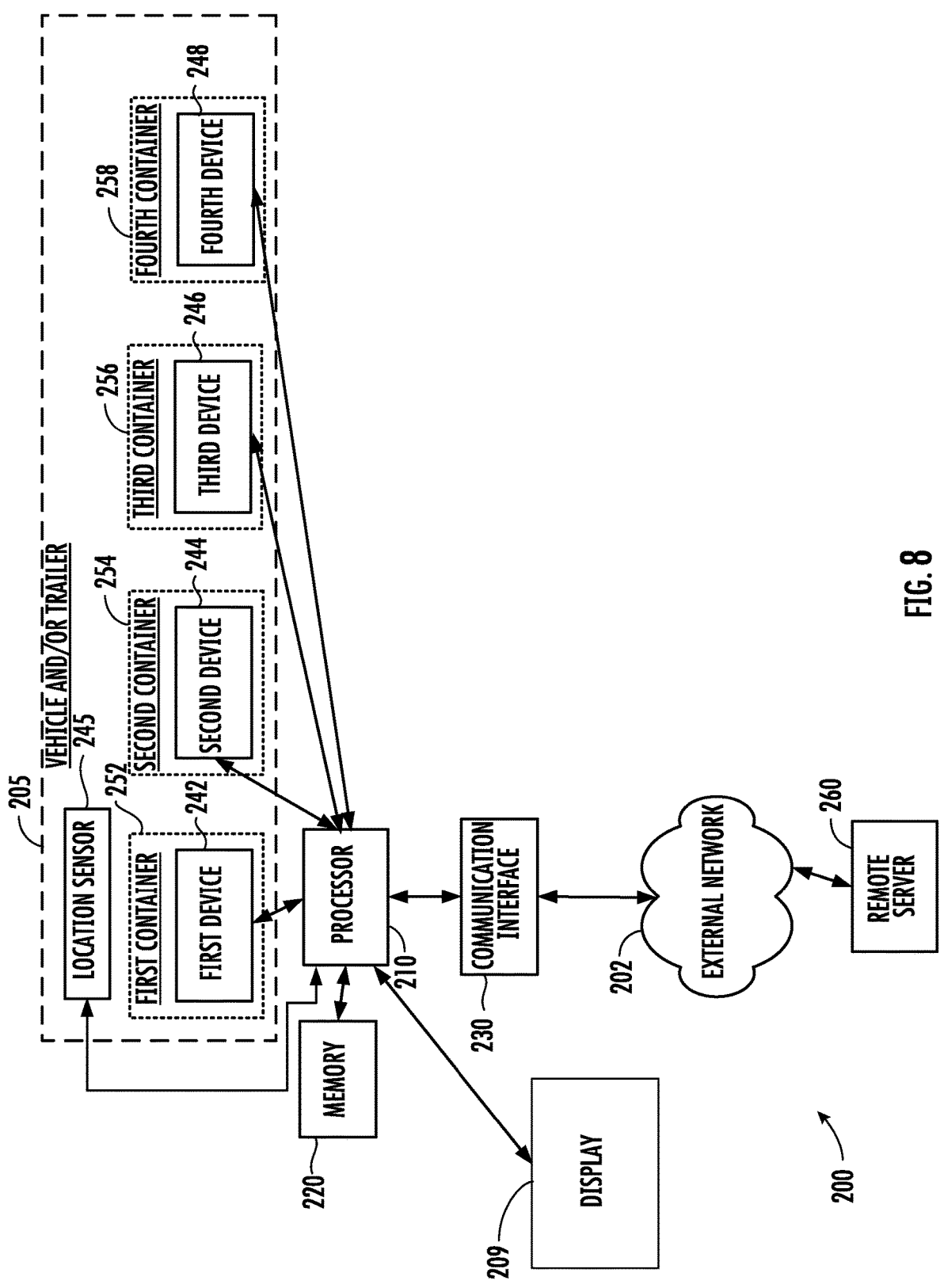
FIG. 8 is a block diagram of an example system, in accordance with some embodiments discussed herein.

FIG. 8 is a block diagram showing an example system 200 according to some embodiments. The system 200 may have a processor 210 in communication with a memory 220. In some embodiments, the processor 210 may also be in communication with a display 209, which may be used, for example, to make notifications to a user. The processor 210 may also be optionally in communication with an external network 202 through a communication interface 230, and the external network 202 may be connected to a remote server 260 (and/or other displays or remote devices).

The processor may be in communication with a vehicle and/or trailer 205. While the block diagram of FIG. 8 shows the processor 210 being external from the vehicle and/or trailer, it should be appreciated that, in other embodiments, the processor 210 may be located within the vehicle and/or trailer 205. The vehicle and/or trailer 205 may include one or more containers, such as first container 252, second container 254, third container 256, and fourth container 258. The first container 252 may include a first device 242, the second container 254 may include a second device 244, the third container 256 may include a third device 246, and the fourth container 258 may include a fourth device 248. The first device 242, the second device 244, the third device 246, and the fourth device 248 may each include an accelerometer. Further, in some embodiments, the first device 242, the second device 244, the third device 246, and the fourth device 248 may each also optionally include a gyroscope, a location sensor, timer/clock, and/or a thermometer, among other devices.

The processor 210 may be configured to receive data from one or more of the first device 242, the second device 244, the third device 246, and the fourth device 248. The data may include accelerometer data from an accelerometer located within each of the first device 242, the second device 244, the third device 246, and the fourth device 248. Additionally, in some embodiments, the data may include location data received from a location sensor 245. The location sensor 245 may be located on the vehicle and/or trailer 205, as shown in FIG. 8, or in some embodiments, there may be a location sensor 245 in each of the first container 252, the second container 254, the third container 256, and the fourth container 258 (e.g., within each of the first device 242, the second device 244, the third device 246, and the fourth device 248). Other types of data may also be received, such as gyroscope data, temperature data, time/clock data, or other types of data.

The data received by the processor 210 may be used to determine tilt angles of the first container 252, the second container 254, the third container 256, and the fourth container 258. For example, a tilt angle may be determined by comparing accelerometer data from one of the devices to past accelerometer data or predetermined data. The processor 210 may then compare the tilt angle(s) to a predetermined threshold, and when the processor 210 determines that the tilt angle(s) satisfy the predetermined threshold (notably, this encompasses where the data is directly compared to the past accelerometer data or the predetermined data to determine if the threshold has been satisfied—e.g., without transforming the data into a tilt angle per se), the processor 210 may cause a notification to be made to a user. For example, the processor 210 may cause a notification to appear on the display 209. Additionally or alternatively, the processor 210 may cause a signal to be sent to a remote location, e.g., through the communication interface 230, external network 202, and/or remote server 260. Other notification methods are also contemplated within the scope of this disclosure.

It should be appreciated that, although the processor 210 in FIG. 8 is shown as being in communication with the vehicle and/or trailer 205, in other embodiments, the processor 210 may be in communication with numerous vehicles and/or trailers in addition to the vehicle and/or trailer 205.

Example Flowchart(s)

Embodiments of the present disclosure provide various methods for determining a status of a container, such as described herein. Various examples of the operations performed in accordance with some embodiments of the present disclosure will now be provided with reference to FIG. 9.

Figure 9:
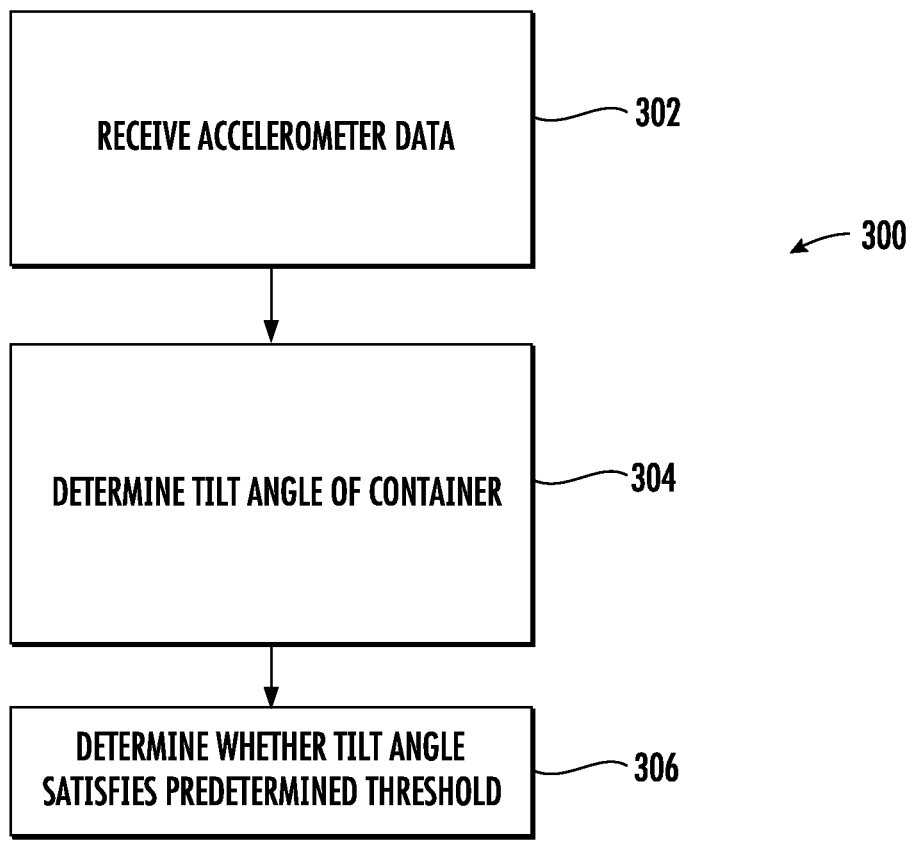
FIG. 9 is a flowchart showing an example method of determining a status of a container, in accordance with some embodiments discussed herein.

FIG. 9 illustrates a flowchart according to an example method 300 of determining a status of a container according to an example embodiment. The method 300 may include receiving accelerometer data at operation 302. For example, accelerometer data may be received from an accelerometer that is or is within a device positioned on or within a container, and the container may be, in some embodiments, disposed on a vehicle or trailer in a way that allows for rotation of the container thereon. Further, operation 302 may optionally include receive other types of data. At operation 304, the method includes determining a tilt angle of the container, as described herein. For example, determining the tilt angle may include comparing the accelerometer data past accelerometer data and/or predetermined data, among other strategies. At operation 306, the method includes determining whether the tilt angle satisfies a predetermined threshold. For example, the predetermined threshold may be a tilt angle that represents an assumption that the container is empty (or close to empty). Additional operations are also contemplated, such as providing a notification, such as described herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A system comprising:
   a container disposed on a trailer, the container configured to rotate such that at least some of one or more materials that are optionally disposed within the container are able to exit the container due to gravitational force;
   a device attached to the container, the device comprising an accelerometer configured to sense movement corresponding to the container discharging the at least some of the one or more materials;
   a location sensor configured to determine location data corresponding to a current container location, the container location data comprising GPS data;
   a processor; and
   a memory including computer executable instructions, the computer executable instructions configured to, when executed by the processor, cause the processor to:
   receive accelerometer data from the accelerometer;
   determine a tilt angle of the container based on the accelerometer data;
   determine whether the tilt angle satisfies a predetermined threshold, wherein the predetermined threshold is a value representative of an assumption that a certain amount of the one or more materials has been removed from the container; and
   cause a user at a remote location from the container location to be notified via an external network with a notification, the notification indicating the container location, and when the tilt angle satisfies the predetermined threshold.

2. The system of claim 1, wherein the value is representative of an assumption that the container is empty.

3. The system of claim 1, wherein the processor is further configured to:
   receive the location data;
   determine whether the location data is outside of a predetermined geographical area; and
   in response to the determination that the location data is outside of the predetermined geographical area, perform at least one of the following:
   cause an indication to be provided, wherein the indication is associated with the current location, or
   disregard the data.

4. The system of claim 3, wherein the processor and the memory are located at the remote location.

5. The system of claim 3, wherein the processor and the memory are located within the device.

6. The system of claim 1, wherein the device is positioned on a rotational axis of the container.

7. The system of claim 1, wherein the device is positioned on a side wall of the container.

8. The system of claim 1, wherein the device is positioned on a bottom wall of the container.

9. The system of claim 1, wherein causing the user to be notified when the tilt angle satisfies the predetermined threshold comprises at least one of sending a signal to the remote location or presenting the notification on a display.

10. The system of claim 1, wherein the tilt angle is determined by comparing the accelerometer data with at least one of past accelerometer data or predetermined data.

11. A system comprising:

a plurality of containers disposed on a trailer, wherein each container of the plurality of containers is configured to rotate such that at least some of one or more materials that are optionally disposed therein is able to exit therefrom due to gravitational force;

a plurality of devices, wherein each device of the plurality of devices is attached to one of the plurality of containers and comprises an accelerometer configured to sense movement corresponding to a corresponding container discharging the at least some of the one or more materials and each device of the plurality of devices further comprises a location sensor configured to determine location data corresponding to a current container location, the container location data comprising GPS data;

a processor; and a memory including computer executable instructions, the computer executable instructions configured to, when executed by the processor, cause the processor to:

receive accelerometer data from an accelerometer of one of the plurality of devices;

determine, based on the received accelerometer data, a tilt angle of the container corresponding to the one of the plurality of devices;

determine whether the determined tilt angle satisfies a predetermined threshold, wherein the predetermined threshold is a value representative of an assumption that a certain amount of the one or more materials has been removed from the container; and cause a user at a remote location from the container location to be notified via an external network with a notification, the notification indicating the container location, and when at least one of the tilt angles satisfies the predetermined threshold.

12. The system of claim 11, wherein the value is representative of an assumption that the container being evaluated is empty.

13. The system of claim 11, wherein the processor is further configured to:

receive the location data;

determine whether the location data is outside of a predetermined geographical area; and in response to the determination that the location data is outside of the predetermined geographical area, perform at least one of the following:

cause an indication to be provided, wherein the indication is associated with the current container location, or disregard the data.

14. The system of claim 13, wherein the processor and memory are located at the remote location.

15. The system of claim 13, wherein the processor and memory are located within the each device.

16. The system of claim 11, wherein causing the user to be notified when at least one of the tilt angles satisfies the predetermined threshold comprises at least one of sending a signal to the remote location or presenting the notification on a display.

17. The system of claim 11, wherein the processor is further configured to cause the user to be notified when all of the tilt angles satisfy the predetermined threshold.

18. A method comprising:

receiving accelerometer data from an accelerometer configured to sense movement corresponding to a container discharging at least some of one or more materials, wherein the container is disposed on a trailer, the container configured to rotate such that the at least some of the one or more materials are able to exit the container due to gravitational force;

determining location data corresponding to a current container location, the container location data comprising GPS data determining a tilt angle of the container based on the accelerometer data;

determining whether the tilt angle satisfies a predetermined threshold, wherein the predetermined threshold is a value representative of an assumption that a certain amount of the one or more materials has been removed from the container; and causing a user at a remote location from the container location to be notified via an external network with a notification, the notification indicating the container location, when the tilt angle satisfies the predetermined threshold, and that the container needs to be refilled.

19. A device for determining a tilt angle of a container configured to discharge at least some of one or more materials by rotating such that the at least some of the one or more materials are able to exit the container due to gravitational force, the device comprising:

an accelerometer configured to sense movement corresponding to the container discharging the at least some of one or more materials;

a location sensor configured to determine location data corresponding to a current container location, the container location data comprising GPS data;

a processor; and a memory including computer executable instructions, the computer executable instructions configured to, when executed by the processor, cause the processor to:

receive accelerometer data from the accelerometer;

determine a tilt angle of the container based on the accelerometer data;

determine whether the tilt angle satisfies a predetermined threshold, wherein the predetermined threshold is a value representative of an assumption that a certain amount of the one or more materials has been removed from the container; and cause a user at a remote location from the container location to be notified via an external network with a notification, the notification indicating the container location, and when the tilt angle satisfies the predetermined threshold.

20. The system of claim 1, wherein causing the user to be notified occurs in response to the accelerometer sensing a movement of the container.

21. The system of claim 20, wherein the processor receives the accelerometer data in shorter intervals when the movement of the container is detected.

22. The system of claim 1, wherein the notification further indicates a status of the container, the status based on the tilt angle and how much of the one or more materials has been removed from the container.

\* \* \* \* \*